Inventor
LESLIE REGINALD NIXON, DECEASED.
BY EDITH MAUD NIXON, EXECUTRIX.
ANDREW STAMBERGER.
by Sommers & Young
Attorneys Sept. 29, 1959 L. R. NIXON ET AL 2,906,982
ELECTRO-MAGNETIC CARBON PILE REGULATORS
Original Filed Dec. 22, 1953 3 Sheets-Sheet 2

Inventor
LESLIE REGINALD NIXON, DECEASED,
BY EDITH MAUD NIXON, EXECUTRIX,
ANDREW STAMBERGER.
by Sommers & Young
Attorneys

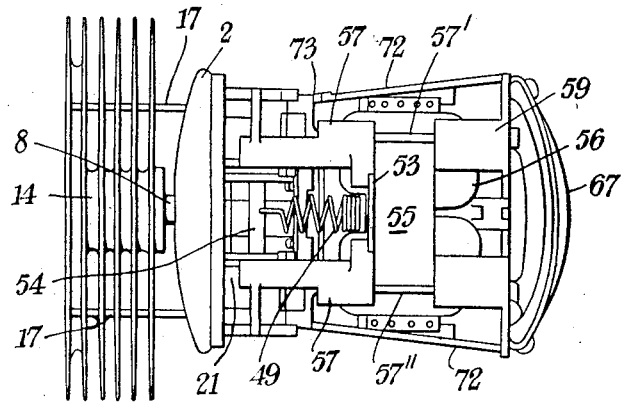
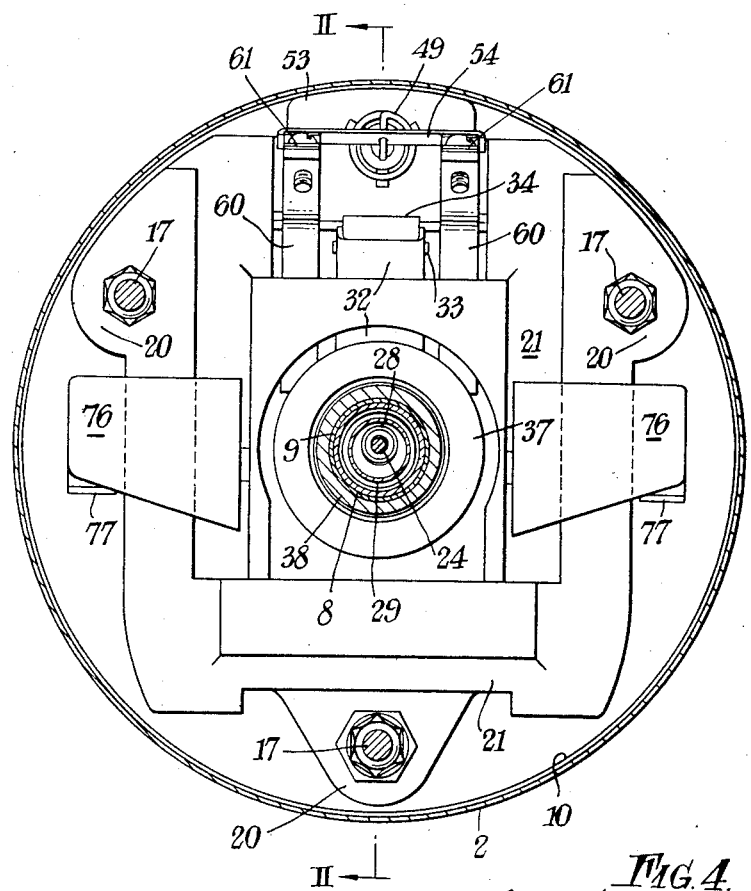

United States Patent Office 2,906,982
Patented Sept. 29, 1959

2,906,982
ELECTRO-MAGNETIC CARBON PILE REGULATORS

Leslie Reginald Nixon, deceased, late of Catford, London, England, by Edith Maud Nixon, executrix, Middleton-on-Sea, and Andrew Stamberger, Brockley, London, England, assignors to J. Stone & Company (Deptford) Limited, London, England Original application Serial No. 399,794, December 22, 1953. This application December 18, 1956, Serial No. 629,438

Claims priority, application Great Britain December 31, 1952

5 Claims. (Cl. 338—106)

This application has been divided from and is a continuation of application Serial No. 399,794, filed on December 22, 1953, now Patent No. 2,828,395.

The invention concerns improvements relating to electromagnetic carbon-pile regulators having the magnet system, carbon pile and pile-comprising mechanism totally enclosed. Such enclosure can be made to achieve substantial advantages, but there are problems to be overcome in applying the principle to everyday practical use. It is an object of the invention to overcome problems which arise from the difficulty of meeting the magnetic and mechanical requirements of the regulator within the space available in a compact enclosure.

A preferred embodiment of the invention will now be more fully described by way of example and with reference to the accompanying drawings, in which:

Figure 3 is a plan view to a smaller scale and intended only to indicate the relative positions of the main components, Figure 4 is a cross section on the line IV—IV in Figure 1.

The embodiment illustrated has been devised more particularly for use as a voltage regulator on aircraft and for other cases where reliable high performance is required in conjunction with compactness. The features to be described may, however, be employed with advantage in regulators for other purposes.

Figure 1:
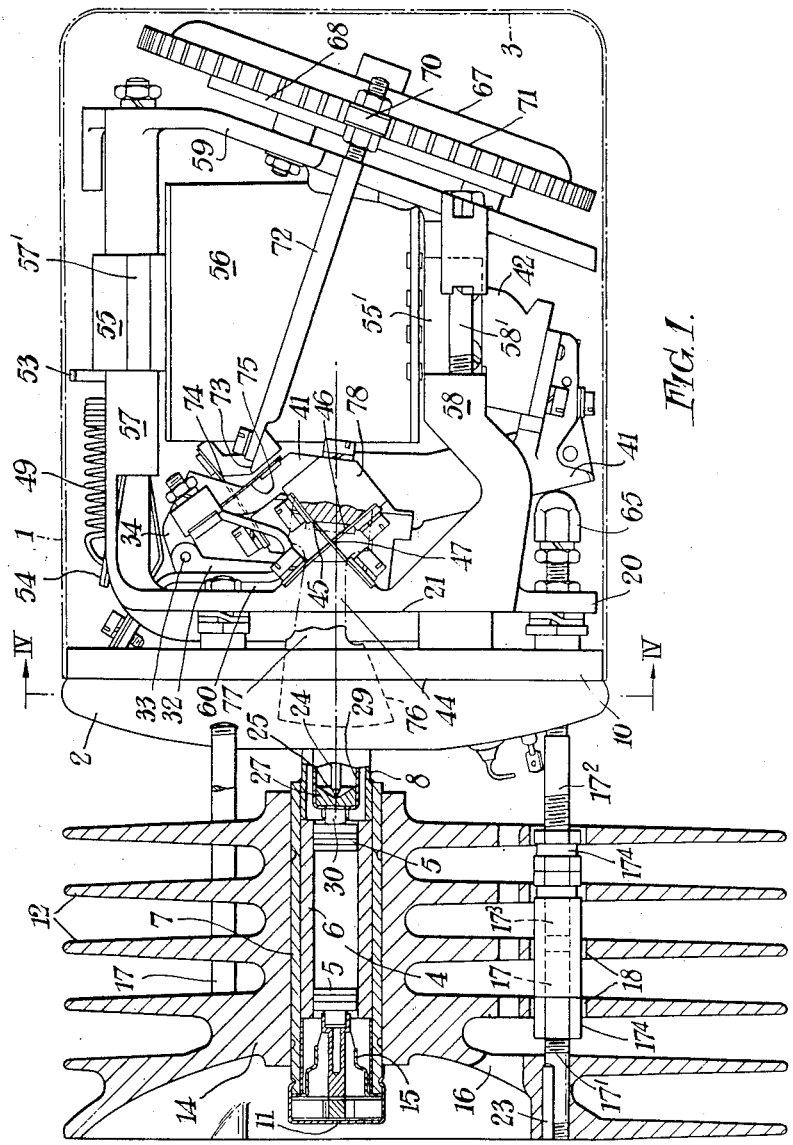
Figure 1 is a side elevation of a carbon-pile regulator with an enclosing can removed and with the pile shown in axial section.

In the regulator illustrated, the magnet system and the pile-compressing mechanism are enclosed in a cylindrical can 1 (shown by a chain line in Figure 1) having the end 2 or both ends 2, 3 domed and made, for example, of magnetic martensitic stainless steel. The pile 4, composed of small diameter discs 5, guided in a ceramic sheath 6, is enclosed in a metal tube 7 shrunk upon the sheath 6 and located co-axially with the can 1. To minimise heat conduction between the pile 4 and magnet system in the can 1, the metal tube 7 is extended towards the can by a part of considerably reduced annular cross section (for example reduced to about one eighth or even less) and made for example of poorly conducting austenitic stainless steel. As illustrated, this part is a co-axial tube 8 soldered into the tube 7 and into an inturned, central, funnel-shaped portion 9 (Figure 2) of the adjacent cover 2 of the can. The cover 2 is separate from the body of the can 1 and is soldered into it by means of a flange 10. A domed shape of the covers 2, 3 not only stiffens them against deflection due to any pressure difference between the inside and outside of the can 1, but, as regards the cover 2, also further lengthens the path for heat conduction between the pile 4 and the body of the can.

The outer end of the tube 7 is tightly closed by a terminal seal 15 forming a fixed abutment for the pile 4, the seal being covered by a protective cap 11. The can 1 and tubes 7, 8 thus form a completely sealed container the whole of which is filled with an inert atmosphere. This is preferably a gas or a gas mixture with a high viscosity and thermal conductivity. A suitable gas is helium.

The above-described arrangement forms the subject of the aforesaid application No. 399,794.

To avoid danger of local overheating with consequent risk of fire, especially on aircraft, the maximum temperature rise anywhere on the outside of the regulator should be as low as possible. A robust jacket with fins 12 and a core 14 sufficiently thick to obtain as low a temperature rise as possible is therefore employed. Preferably, it is pressure die-cast around the tube 7 enclosing the pile 4, thus ensuring uniform high thermal conductivity between the tube and jacket and also rendering machining of mating surfaces unnecessary.

The fixed abutment 15 at the sealed outer end of the tube 7, that is the fixed end of the pile 4, is connected to the fixed magnet structure and is located in relation to the whole magnet system by way of the outer-end fin 16 of the jacket and a number of spaced tie rods 17 extending with clearance through holes 18 in the other fins 12 and passing by way of sealed connections 19 with the cover 2 into the interior of the can 1 where they are connected to lugs 20 on an end part 21 of the fixed structure supporting the magnet system hereinafter described. The tie rods 17 form a rigid connection between the several parts and avoid the possibility of lost motion in the pile-compressing mechanism when the pile 4 is compressed. The rods 17 may be made of a metal with a coefficient of expansion suitable for ensuring temperature compensation for relative thermal expansion of the carbon pile 4. In this case, the domed shape of the cover 2 also assists in minimising stresses caused by difference in thermal expansion between the rods 17 and the tubes 7, 8. The end fin 16 is made of dished shape, with the concavity outwards, in order to increase its rigidity and also to afford protection to the seal at the outer end of the tube 7.

Necessary readjustment for eventual change in the length of the pile 4 may be permitted without unsealing the regulator by providing for external adjustment of the relative positions of the magnet system and abutment 15, that is the fixed end of the pile. This may be done by providing adjustable screw connections between the tie rods 17 and the end fin 16. Preferably and as illustrated for the lower rod 17 in Figure 1, however, one or each of the tie rods is composed of two stud portions $17^1$, $17^2$ screwed with threads of different pitch into a sleeve nut portion $17^3$. Turning of the nut portion $17^3$ will thus adjust the effective length of the tie rod. The adjusted position can be locked by means of lock nuts $17^4$. In this case, not only the inner end of the stud is fixed, namely in the lug 20, but also the outer end in the fin 16, as by a key 23. The above-described adjustment means forms the subject of our co-pending patent application No. 34,441/55.

The pile is arranged to be compressed through a strut 24 with pointed ends 25 (Figure 1) and 26 (Figure 2) acting between cups 27, 28 at least one of which may be made of insulating material, such as glass or synthetic sapphire. The cup 27 adjacent to the pile 4 is enclosed in a conducting ferrule 29 carrying the movable collector, which comprises a carbon plug 30 at the adjacent end of the pile. The other cup 28 is mounted by means of a holder 31 in a flanged plate 32 which is connected by a pivot 33 to the upper end 34 of a clapper structure constituting the movable element of the magnet system. The plate 32 and the cup 28 carried by it are urged towards the strut 24 by a helical compression spring 35 abutting against a part 35′ of the clapper structure and located approximately upon the prolonged axis of the pile 4.

The ferrule 29 is extended, out of contact with the strut 24, into the interior of the can 1 where it has a flange 36 (Figure 2) engaged by a coaxial helical compression spring 37 of relatively large diameter made from strip wound on edge and abutted through a hat-shaped insulating washer 38 against the inside of the funnel-shaped portion 9 of the cover 2. The spring 37 serves to steady the ferrule 29 and also to cause the said ferrule and the pile collector 30 to follow the strut 24 under conditions in which the pile reaction is low. It may conveniently also be used to make electrical connection between a stationary conductor 39 and the ferrule 29, for which purpose it is preferably made of a good electrical conductor, such as copper.

Figure 2:
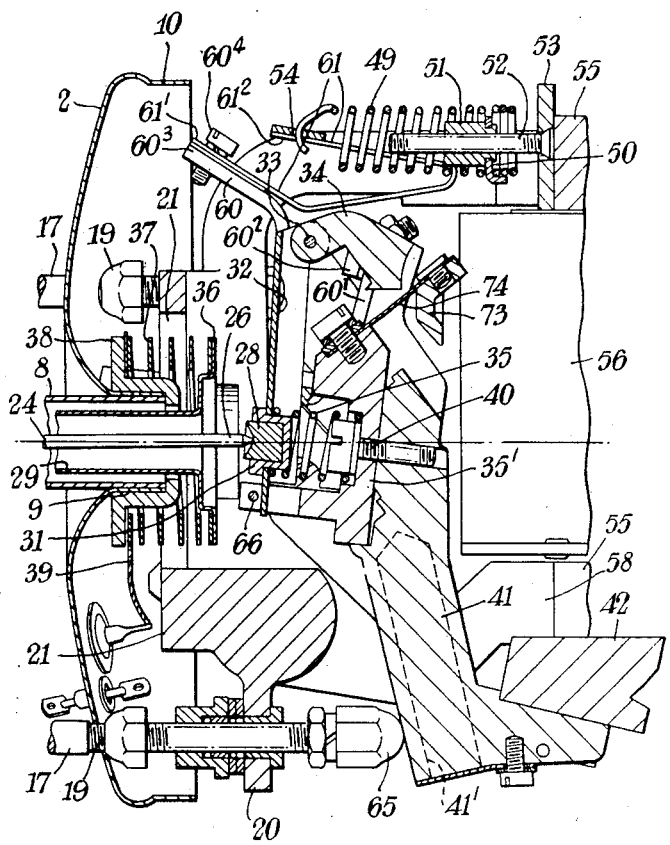
Figure 2 is an axial section, on the line II—II in Figure 4, through the pile-compressing mechanism.

The part 35′ of the clapper structure is fixed by a screw 40 to the main L-shaped part 41 of this structure carrying the armature 42. The clapper structure is mounted upon a part 44 (Figure 1), formed on or fixed to the part 21 of the fixed structure, by means of pairs of crossed leaf springs 45, 46. The axis 47 of rocking of the clapper so determined is located very close to the prolonged axis of the pile 4 and the arrangement is such (Figure 2) that the strut 24 and the virtual lever arm (between 47 and point of 26) by which the clapper acts on the said strut closely approaches a dead-centre condition when the pile is compressed, so as to balance the increasing pile reaction. In order to minimise sideways thrust on the movable collector 30, the rocking movement of the strut 24 which occurs upon movement of the clapper structure is arranged to be initially, for a slight clapper movement, towards alignment with the pile 4 and then away from alignment (Figures 2 and 4 show the mechanism in the position of rest, i.e. with the armature unattracted and the pile compressed).

The main spring of the regulator comprises a helical tension spring 49, or a plurality of such springs, disposed substantially parallel to the prolonged axis of the pile 4, but near the cylindrical wall of the can 1. The fixed anchorage 50 for the spring can be set and adjusted by means of a nut 51 on a screw 52 mounted in a cross piece 53 secured to the fixed structure. The movable anchorage 54 of the spring, which acts upon the clapper structure through a bimetal device hereinafter described, may be arranged, as shown, so that the virtual lever arm with which it acts about the axis 47 decreases with extension of the spring 49. This arrangement reduces the necessity for using a spring with a low rate, which would be difficult to accommodate, and also permits of the use of a longer spring.

The magnet itself is a horseshoe magnet 55 disposed transversely of the can with, for the sake of explanation, the poles 55′ projecting downwardly. The magnet, carrying its winding 56 on its two limbs, is clamped to two upper and two lower claw-like parts, 57 and 58 respectively, which extend lengthwise of the can 1 from the end part 21 of the fixed structure. The magnet is so clamped by studs 57′, 58′ passing through an end frame 59 hereinafter referred to. The armature 42 has, due to the above-described relative disposition of the parts, an oblique approach to the poles 55′. The armature and/or the poles may be appropriately profiled in per se known manner in order to obtain a required magnet characteristic.

Figure 5:
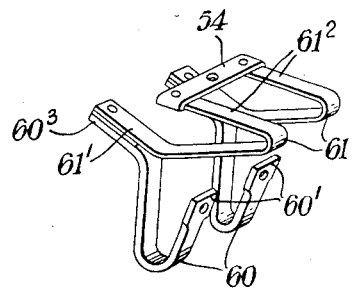
Figure 5 is a perspective view of a bimetal device.

For the connection to the bimetal device and for the mounting of the pivot 33, the clapper structure extends beyond the axis 47, that is upwardly, to a point near the main spring 49. The bimetal device is intended, by varying the effective action of the spring, to effect compensation for change of resistance of the magnet winding due to temperature variation. One suitable construction of such device comprises two pairs of bimetal hairpin strips, 60 and 61 respectively (Figure 5). The first pair of strips 60 is connected at its ends 60¹ by screws 60² to the upper end 34 of the clapper part 41 and at the other ends 60³ by screws 60⁴ to the adjacent ends 61¹ of the strips 61. The other ends 61² of the latter are connected to a cross piece 54 constituting the movable anchorage for the spring 49. The higher-expansion sides of the bimetal strips 60, 61 are the outer sides of the hairpin shapes in both cases. With increase in the temperature, determined mainly by the temperature of the winding 56, the bimetal strips 60 will deflect so as to reduce the tension in the spring 49, while the strips 61 will deflect to reduce the length of the virtual lever arm with which the spring acts and thus to reduce the effective rate of the spring. In this arrangement, in any position of the armature 42, the strips 60 effect compensation for the reduction in the magnet torque, resultant upon the decrease in current due to the increased resistance of the winding 56 at the increased temperature, while the strips 61 effect compensation for the reduction in the rate of change of magnet torque with armature travel which also results from the reduction in current. The compensation thus to be provided will naturally depend upon the characteristics of the magnet system. By this means, for example, regulation for constant voltage can be obtained which is substantially unaffected by temperature variation in the magnet winding 56. The above-described bimetal device forms the subject of co-pending patent application No. 629,135, filed December 18, 1956.

The bimetal device described, or a simpler form of such device, for compensating for the effect of heating due to the current in the winding 56 and/or due to ambient-temperature variation, may be arranged to be influenced by an auxiliary heater whose temperature rise is caused in known manner to be proportional to that of the winding. This heater may be housed, for example, in a bore in the clapper 41. A suitable position for this bore is indicated at 41′ in Figure 2. By this means, the heating of the device can be well matched to the heating of the winding. Alternatively or in addition, a resistance with a negative temperature co-efficient may be employed connected in series with the winding 56. Close contact between this resistance and the winding may be obtained by winding the former into the latter or arranging it closely thereto on the inside or outside. This resistance may be shunted by a fixed resistance in order to modify the compensation effect in required fashion.

In the illustrated inoperative condition of the regulator, the clapper 41 is held against a stop 65 (Figure 2) by the spring 49, the pile 4 being maintained under compression by the auxiliary spring 35 bearing on the plate 32. As shown in Figure 2, the stop 65 is adjustably mounted on the end of the lower tie rod 17. For coupling the plate 32 to the clapper when the armature 42 is attracted, the clapper part 35′ is provided with a pin 66 engageable with the remote side of the end of the plate 32. In the aforesaid inoperative condition, there is a slight lost-motion gap between the pin 66 (Figure 2) and plate 32 and as long as this gap exists, the minimum resistance of the compressed pile 4 will be practically unaffected by pile shrinkage. When the armature 42 is attracted, the lost motion is first taken up and then the plate 32 and the parts 31, 28 connected to it are carried along by the clapper 41 and the pile is decompressed. If desired, the lost-motion gap may be controlled by a bimetal device which compensates for any change in the distance between the fixed end of the pile and the magnet system due to thermal-expansion effects.

A pneumatic dashpot 67 of the annular-diaphragm type is arranged in a relatively cool position at the end of the can 1 remote from the pile, where its plunger portion 68 is fixed on the outside of the end frame 59. In order to obtain as compact an arrangement as possible, the dashpot 67 and the frame 59 are inclined in relation to the axis of the can (Figure 1), the axis of the dashpot extending towards the end of the clapper 41 remote from the armature 42. Ears 70 on the pot portion 71 of the dashpot are adjustably connected to rods 72 which straddle the magnet and are themselves connected to the ends of a stiff cross bar 73 flexibly connected to the clapper 41 by three crossed springs 74, 75 (Figure 2), the spring 74 being connected to the middle of the bar with one spring 75 on each side.

Counter-balance weights 76 are supported from the clapper 41 by arms 77 secured to parts 78 extending laterally from the said clapper. These weights serve to balance the clapper structure and armature in relation to the axis 47.

The magnet core may be composed of grain-oriented wound strip, for example as described in the specification of our application Serial No. 367,620.

The whole regulator may be suspended upon a base (not shown) by means of an anti-vibration mounting, one flexible support, say in the form of a spring system, being provided at each end of the regulator approximately concentrically with the axis of the can 1.

Such construction and arrangement permits of good advantage being taken in practical operation of the following benefits of sealing in an inert atmosphere: Firstly, the pile 4 can be run at a relatively high temperature, so that carbon elements 5 of small cross-sectional area can be used, which reduces the work required to be exerted upon the pile for a given range of resistance variation. For, although the minimum resistance for a given compressive force is substantially independent of the area, the maximum resistance obtainable increases as the area is reduced, because the effects of friction and sensitivity to vibration are reduced. Secondly, with a sealed regulator, the damping afforded by the dashpot 67 is unaffected by atmospheric-pressure variation and, therefore, by altitude. Also the inert gas used may be one of suitable viscosity for the dashpot. Further, by using a gas of high thermal conductivity, the temperature gradients between the pile 4 and the tube 7 and between the winding 56 and the bi-metal strip device 60, 61 can be reduced. Finally, with enclosure in an inert gas, both the electrical insulation and the flexible material of the dashpot will tolerate a higher working temperature. In addition, the sealed enclosure affords proofing against climatic conditions without further special provision.

We claim:

1. An electromagnetic carbon-pile regulator, comprising a magnet system having a magnet and a rocking armature, a carbon pile and pile compressing mechanism through which the said armature acts upon the pile, the said mechanism comprising a movable abutment for the said pile, a ferrule carrying the said abutment and a co-axial helical compression spring, constituted of a strip wound on edge, supporting and steadying the said ferrule.

2. An electromagnetic carbon-pile regulator, comprising a magnet system with a magnet and a rocking armature, a carbon pile and pile-compressing mechanism through which the said armature acts upon the pile, the said mechanism comprising a movable abutment for the pile, a strut acting between the said armature and the said abutment, and a co-axial spring which is positioned to guide the said abutment and to cause it to follow the strut when the pile reaction is low.

3. A regulator according to claim 2, wherein the spring serves also to establish electrical connection with the movable pile abutment.

4. An electromagnetic carbon-pile regulator, comprising a magnet system having a magnet and a rocking armature, a carbon pile and pile-compressing mechanism through which the said armature acts upon the pile, said mechanism comprising a main control spring positioned to act upon the armature with a lever arm the virtual length of which decreases as the armature is attracted.

5. An electromagnetic carbon-pile regulator, comprising a magnet system having a magnet and a rocking armature, a carbon pile and pile-compressing mechanism through which the said armature acts upon said pile, said pile-compressing mechanism comprising a thrust member bearing against the pile, an abutment for the thrust member pivotally mounted in relation to said armature and engageable with a slight initial lost motion by the armature when attracted, and a spring disposed between the abutment and the armature and acting in the direction for urging said abutment against said thrust member.

References Cited in the file of this patent

UNITED STATES PATENTS

| | | |
|---|---|---|
| 1,985,280 | Carleton | Dec. 25, 1934 |
| 2,489,071 | Austin | Nov. 22, 1949 |
| 2,533,038 | Neild | Dec. 5, 1950 |
| 2,581,280 | Musso | Jan. 1, 1952 |